US009250055B2

(12) United States Patent
Briegel et al.

(10) Patent No.: US 9,250,055 B2
(45) Date of Patent: Feb. 2, 2016

(54) HIGH SPEED CONTACT DETECTOR FOR MEASUREMENT SENSORS

(71) Applicant: MITUTOYO CORPORATION, Kanagawa (JP)

(72) Inventors: Matthias Briegel, Eindhoven (NL); Edwin Bos, Dommelen (NL); Frank Coenen, Eindhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 110 days.

(21) Appl. No.: 14/273,980

(22) Filed: May 9, 2014

(65) Prior Publication Data

US 2015/0323300 A1  Nov. 12, 2015

(51) Int. Cl.
*G01B 7/012* (2006.01)
*G01B 5/012* (2006.01)

(52) U.S. Cl.
CPC ............... *G01B 7/012* (2013.01); *G01B 5/012* (2013.01)

(58) Field of Classification Search
CPC ........ G01B 5/008; G01B 5/012; G01B 7/008; G01B 7/012
USPC ...................... 33/554, 503, 558, 561; 702/168
See application file for complete search history.

(56) References Cited

U.S. PATENT DOCUMENTS

| | | | | |
|---|---|---|---|---|
| 4,769,919 A * | 9/1988 | Lloyd | ................... | G01B 5/012 33/558 |
| 4,815,214 A * | 3/1989 | Enderle | ................. | G01B 7/002 33/503 |
| 5,222,034 A * | 6/1993 | Shelton | .................. | G01B 7/002 33/503 |
| 5,526,576 A * | 6/1996 | Fuchs | .................... | G01B 21/04 33/503 |
| 5,862,604 A | 1/1999 | Fuchs | | |
| 5,949,257 A * | 9/1999 | Ishikawa | ................ | H03K 5/082 327/34 |
| 6,044,569 A | 4/2000 | Ogihara et al. | | |
| 6,307,084 B1 * | 10/2001 | Matsuki | ................. | G01B 7/012 33/503 |
| 6,457,366 B1 * | 10/2002 | Hidaka | .................. | G01B 5/012 73/634 |
| 6,810,597 B2 * | 11/2004 | Grzesiak | .............. | G01B 21/042 33/503 |
| 7,254,506 B2 * | 8/2007 | McMurtry | ........... | G01B 21/045 33/502 |
| 7,318,284 B2 * | 1/2008 | McMurtry | ........... | G01B 21/045 33/503 |
| 8,676,533 B2 * | 3/2014 | Wooldridge | ........... | G01B 7/012 702/141 |
| 9,057,598 B2 * | 6/2015 | Vullioud | ................ | G01B 5/012 |
| 2015/0101204 A1 * | 4/2015 | Ould | ..................... | G01B 7/012 33/503 |

FOREIGN PATENT DOCUMENTS

| | | |
|---|---|---|
| EP | 0556574 | 5/1995 |
| EP | 0753717 | 3/1998 |
| EP | 0858015 | 8/1998 |
| EP | 2120004 | 11/2009 |
| JP | H08136241 | 5/1996 |
| JP | 2003050118 | 2/2003 |
| WO | WO2007009458 | 4/2007 |

* cited by examiner

*Primary Examiner* — Christopher Fulton
(74) *Attorney, Agent, or Firm* — Greenblum & Bernstein, P.L.C.

(57) ABSTRACT

A workpiece is measured by a contact detector. The contact detector is moved relatively towards a workpiece. A characteristic of the contact detector that changes as the contact detector contacts the workpiece is measured at a plurality of times. A projected time when the characteristic of the contact detector will meet a predetermined threshold is extrapolated from the characteristic measured the plurality of times and using a processor of a computer. A trigger is set to measure coordinates of the workpiece at the projected time. Coordinates of the workpiece are measured at the projected time based on the set trigger.

20 Claims, 7 Drawing Sheets

**Figure 1
Computer**

HIGH SPEED CONTACT DETECTOR FOR MEASUREMENT SENSORS

BACKGROUND

1. Field of the Disclosure

The present disclosure relates to the field of contact detection for measurement sensors. More particularly, the present disclosure relates to identifying when, based on contact detection, measurement of a workpiece should be taken by a measurement sensor.

2. Background Information

Currently, coordinate measuring machines (CMMs) are used to measure the coordinates of a workpiece. A set of workpiece coordinates in a 2 or 3 dimensional space can be used to model the workpiece. A probe and workpiece are moved relatively towards each other, and a contact detector detects when the probe contacts the workpiece. Contact detectors are used to control the timing of when measurement sensors take measure of the coordinates of the probe, and may detect contact characteristics such as deflection of the probe, as the probe contacts and pushes into or against the workpiece. The probe may probe the workpiece from many different angles and at many different positions, so that the coordinates are taken many times. For consistency between measurements of the coordinates, characteristic thresholds may be used so as to consistently know when to take the coordinates. For example, a threshold amount of deflection in one or more dimensions may be used to determine when to measure the coordinates.

Additionally, the contact detection characteristics may be measured at a rapid pace, such as 1000 or 2000 times per second, as the probe is engaged in a single probing motion to probe the workpiece. Ultimately, for a single probing motion against a single point of the workpiece, only a single coordinate measurement may be desired, such as when contact deflection characteristics of the probe is at or closest to a predetermined threshold amount. By knowing the exact coordinates of the probe at times when the same threshold amount of deflection occurs, the shape of the workpiece can be accurately determined and modeled.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
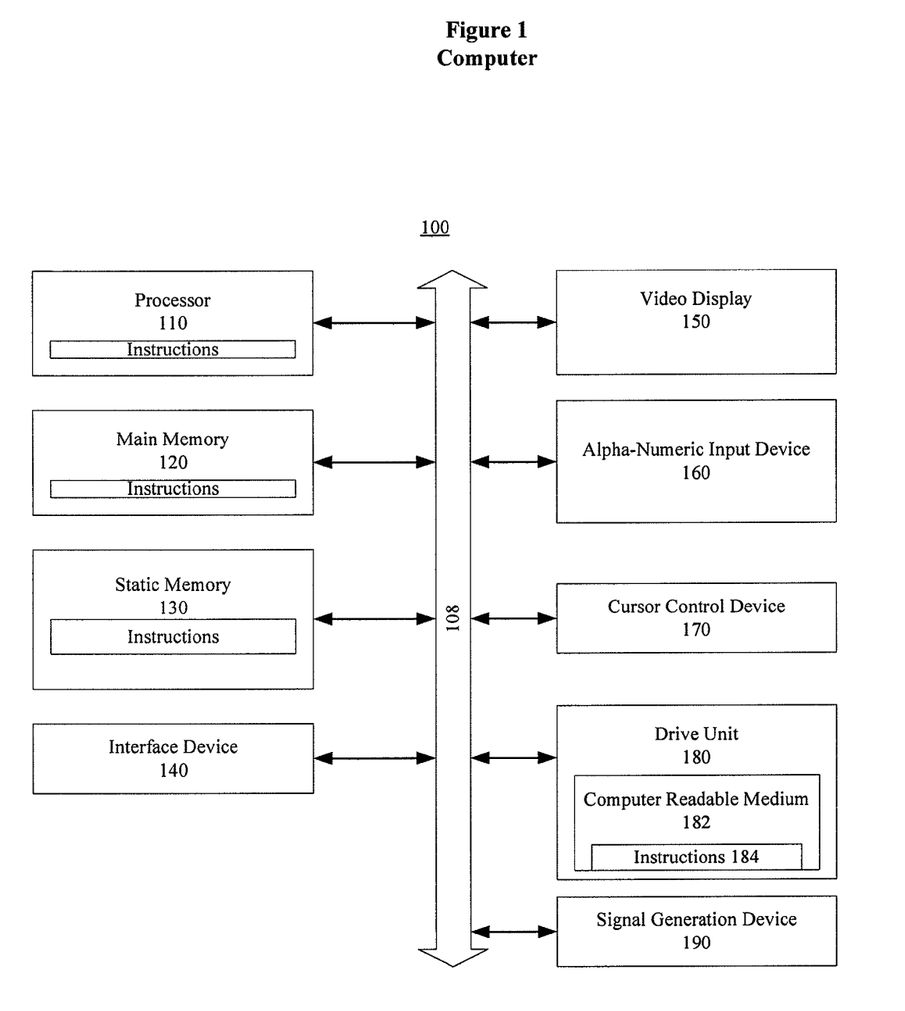
FIG. 1 shows an exemplary general computer system that includes a set of instructions for the high speed contact detector for measurement sensors, according to an aspect of the present disclosure.

FIG. 1 is an illustrative embodiment of a general computer system, on which a method for a high speed contact detector for measurement sensor can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network, to other computer systems or peripheral devices.

The computer system 100 can also be implemented as or incorporated into various devices, such as a stationary computer, a mobile computer, a personal computer (PC), a laptop computer, a tablet computer, a wireless smart phone, a personal digital assistant (PDA), a control system, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and an interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal.

As described herein, a control unit for a high speed contact detector for measurement sensors is used to control coordinate measurements for a tactile probing system on a coordinate measuring machine (CMM). The coordinate measurements are taken in accordance with timing determined by contact detections, whereas the contact detections are based on measurements of contact detection characteristics of contact detectors. The contact detection measurements are measurements of contact detection characteristics that change as a probe contacts a workpiece. Contact detection characteristics include deflection of the probe in one or more dimensions as the probe contacts the workpiece. Deflection may refer to an angle or a distance which shows a degree to which a workpiece is being pressured by contact with a probe.

In an embodiment, a control unit enables the use of a three dimensional (3D) tactile probing system on a coordinate measuring machine. The 3D tactile probing system may produce characteristics of the probe that reflect relative contact with a workpiece, such as displacement of the probe tip in one or more dimensions. For example, the 3D tactile probing system may produce three analog signals which can be converted to 3D tip displacements (X, Y, Z) using a 3×3 matrix multiplication (transformation matrix). Notably, such a 3×3 transformation from signals A, B, C to displacements X, Y, Z may be used by one or more probes but not by other probes. The 3D tactile probing system may have characteristics such as (near) isotropic stiffness and sensitivity, so that the characteristics can be reliably trusted to properly reflect the actual coordinates measured by the probing system. Additionally, the 3D tactile probing system may allow high precision tactile measurements in three dimensions, with repeatability at the nanometer level, and using low probing forces including sub-mN forces. A probe tip may be as small as 50 micrometers in diameter. Ruby tips may be 120 micrometers in diameter. As described herein, the timing at which coordinate measurements are taken is based on when the probe characteristics meet a threshold such that a trigger is generated to take the coordinate measurements.

The control unit described herein for the three dimensional tactile probing system will perform at least two functions. First, the control unit will produce contact characteristic measurements, such as X, Y, Z probe tip deflection values, from probe signals. Second, the control unit will generate a touch-trigger signal that is refined to be accurate using the processes described herein. The description herein for high speed contact detectors for measurement sensors primarily focuses on the timing by which touch-trigger signal is generated.

When a coordinate measuring machine performs a single point measurement, it moves the probe towards the workpiece, the workpiece towards the probe, or the two towards each other, typically in a straight line at a constant velocity. For the purposes of consistency in the description here, references to the movement are mainly to the probe being moved towards the workpiece. The relative movement of the probe towards the workpiece is continued until the coordinate measuring machine receives a trigger signal from the probe controller. A workpiece may also be moved towards a probe. In any event, the probe and workpiece are moved relatively near each other. Once the trigger signal is received, the motion is stopped, the measurement point is taken, and the probe is retracted. Because the probe moves at a constant velocity, the 3D probe deflection will also increase at a constant rate.

Figure 4A:
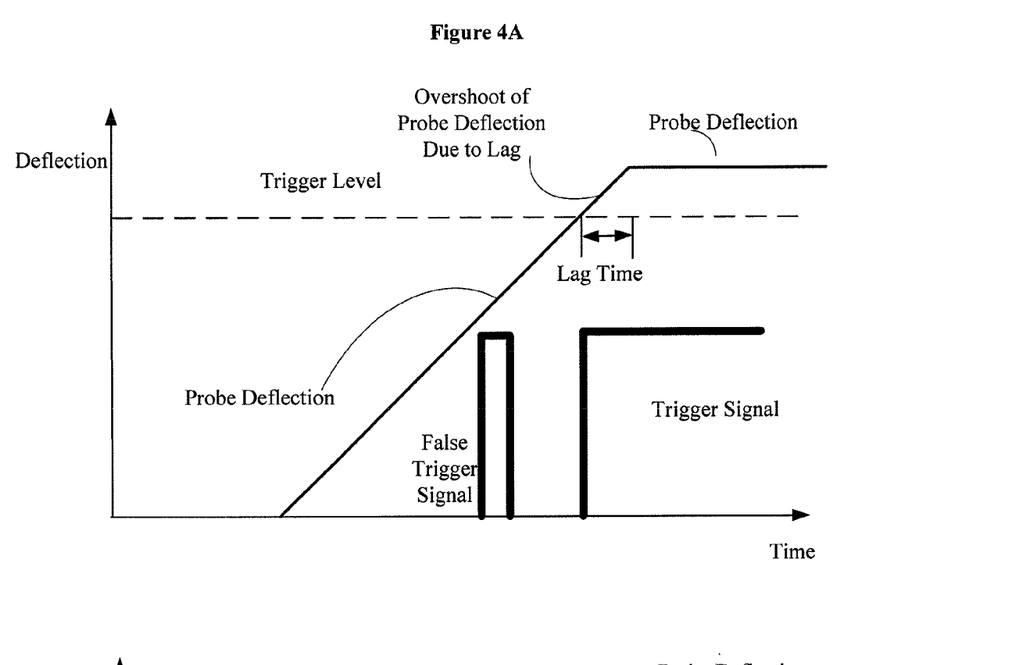
FIG. 4A shows a plot of deflection versus time using the high speed contact detector for measurement sensors, according to an aspect of the present disclosure.

An example of a probe moving at a constant relative velocity towards a workpiece is shown in the plots of FIG. 4A. In the top plot of FIG. 4A, the deflection of the probe is shown linearly increasing with time until the deflection is maintained after a trigger signal is generated. The probe deflection stops increasing after a lag after the trigger signal is generated. The trigger signal is generated when a deflection amount reaches a predetermined threshold trigger level shown in the upper plot by a broken line. For illustration purposes, a false trigger signal is also shown in the plot on the upper portion of FIG. 4A. As shown, the trigger signal remains "high" (on) once triggered when in contact. Additionally, the false trigger signal may remain high for a short duration once triggered.

In the plot in the upper part of FIG. 4A, a false trigger signal can be caused by, for example, vibration. If the false trigger signal is accepted, the probe will be stopped and coordinate measurements taken. In FIG. 4A, the probe is only stopped when the true trigger signal is generated based on the deflection trigger level. The deflection trigger level is measured based on the measured deflection of the probe, and used to signal the coordinate measuring machine to stop the probe movement and take coordinate measurements.

The lower part of FIG. 4A shows the plot of deflection versus time using the high speed contact detector for measurement sensors. In this plot, a trigger time is set rather than a trigger level, and the trigger time is set using earlier measurements of the probe characteristics. The earlier measurements of probe characteristics can be fitted, and the trigger time on the plot can be derived from the fit. The trigger time can also take into account any consistent signal delay or processing delay that is expected to consistently occur, so that the triggered coordinate measurements are properly timed when expected based on the fit from earlier probe characteristics.

Thus, by using real-time probe characteristic measurements to determine when to generate a trigger, false signals can be eliminated, consistent signal and processing lags can be eliminated, and coordinate measurements can be taken at accurate timings. This is shown in the lower part of FIG. 4A, where the probe deflection increases until the trigger signal stops the probe. The coordinate measurements are taken when the trigger signal is used to stop the probe based on the previous measurements of probe characteristics.

Figure 4B:
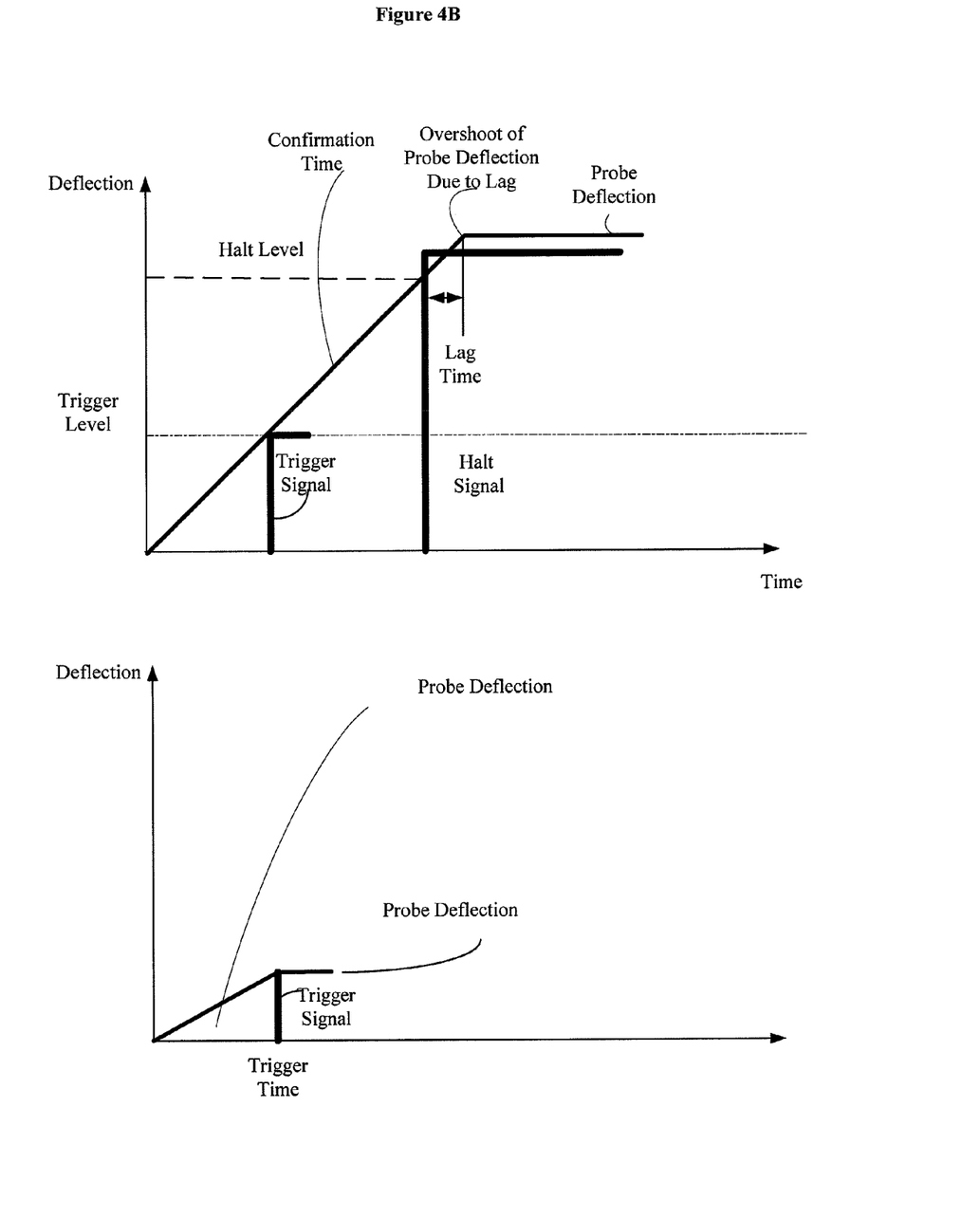
FIG. 4B shows another plot of deflection versus time using the high speed contact detector for measurement sensors, according to an aspect of the present disclosure.

In addition to a first signal used to indicate a trigger, in some applications, a second signal is used to indicate a halt. The use of a halt signal is shown in FIG. 4B. In FIG. 4B, the halt signal is generated by a halt trigger, which is similar to the trigger signal, but at a higher (voltage) level. The halt signal is used to avoid the false trigger signals, by confirming the earlier trigger signal when the signal (voltage) for the deflection continues to rise in an expected manner that confirms the trigger. In the configuration shown in the upper part of FIG. 4B, when a trigger is generated the coordinate axis positions of the probe deflection are logged, but the motion of the probe continues. Only if the halt signal is triggered is the probe stopped and will the logged coordinate axis positions be used as a measurement point of the coordinates. In the case where a trigger is generated, but not a halt signal, the trigger is considered to be a false trigger and the logged axis positions are discarded. Restated, the halt signal is used as confirmation that the earlier logged axis positions of coordinate measurements were properly taken, and false triggers are eliminated when there is no subsequent proper halt signal.

The lower part of FIG. 4b shows the plot of deflection versus time using the high speed contact detector for measurement sensors. In this plot, a trigger time is again set rather than a trigger level and a halt level, and the trigger time is set using earlier measurements of the probe characteristics. The earlier measurements of probe characteristics can be fitted, and the trigger time on the plot can be derived from the fit. Again, the trigger time can also take into account any consistent signal delay or processing delay that is expected to consistently occur, so that the triggered coordinate measurements are properly timed when expected based on the fit from earlier probe characteristics. The halt signal is avoided entirely in the lower part of FIG. 4B. Thus, in addition to eliminating the lag, the time spent waiting for a confirmatory halt is also eliminated. Therefore, the probe is moved, probe characteristics are captured, and a trigger time is identified based on a fit of the earlier captured probe characteristics captured in the same movement of the probe.

Thus, by using real-time probe characteristic measurements to determine when to generate a trigger, false signals can be eliminated, consistent signal and processing lags can be eliminated, a halt signal may be rendered unnecessary, and coordinate measurements can be taken at accurate timings. This is shown in the lower part of FIG. 4B, where the probe deflection increases until the trigger signal stops the probe. The coordinate measurements are taken when the trigger signal is used to stop the probe based on the previous measurements of probe characteristics.

Additionally, the second signal used to indicate a halt can be used by the high speed contact detector. When used by the high speed contact detector, the halt signal may have the same functionality as in the conventional contact detector. Moreover, an algorithm used to predict contact (including both the fitting and the extrapolation) as described herein may also be used to predict or otherwise set the halt level detection.

The triggered measurements of coordinates may also be taken twice, such as both when contact between a probe and work piece is detected (in-contact motion), and when contact between the probe and work piece is lost (out-of-contact motion). Thus, during each probing operation to measure coordinates of a single point, two triggers can be generated, both at the same trigger level, and such a process uses the same timing feedback of probe characteristics during the same motion. That is, once a probe begins retreating from a workpiece, probe characteristics such as deflection can be taken and used to determine when coordinates should be taken.

Alternatively, a second trigger level can be used to set the coordinate measuring time for the out-of-contact motion, and for probe withdrawals it is possible to use a much lower trigger value. When a probe is withdrawing, probe characteristics can be used to generate a fit from which a trigger level as low as (almost) zero can be extrapolated. That is, as described herein, a process using existing characteristic measurements from the same motion can be used to extrapolate a trigger level as low as zero, i.e. from which a trigger time can be set for when the probing force is (almost) zero and the probe is almost entirely out of contact with the workpiece.

Data from deflection characteristics measured from the same single point probe motion is taken and fit, in the manner described herein. A linear or higher order fit is identified for the data. Assuming the probe and coordinate measuring machine have a relative motion with a constant velocity in the period between the instant of contact and the moment that the probe is decelerated, the contact detection from probe characteristics can be described by a linear function, i.e., $y=m \cdot t+b$, where m is the slope, t is the time and b is the offset of the fit. A higher-order fit can be generated using the same approach, though such a fit is more complex to generate. Different (order) fits can also be generated for different approach directions, such as a linear fit in an X direction and a second order fit in a Y direction. Moreover, different order fits can be generated for different coordinate measurement machines, so that instructions for generating the fit can be varied for different models and different circumstances. An operator can input the order of a fit to generate for different coordinate measuring machines and different probes, workpieces, and generally for different circumstances. In the sense that a fit may be considered a filter to improve signal reliability, fits can also be used with other filters to improve signal reliability. Multiple fits could be implemented, where the most appropriate fit is dynamically identified based on the measured or estimated probe velocity.

For the purposes of this description, a linear (first order) fit will be used, but it is clear that higher order fits, or direction-dependent fits, are also possible. The function parameters for the equation that describes the fit can be obtained by performing a linear regression using measured probe deflection values. The calculated function parameters represent the least squares estimator, meaning that the squared errors of the probe deflection are summed to calculate the function parameters. Theoretically, as few as two data points are sufficient to solve the regression and generate the function parameters for the equation that describes the fit. However, more data points make it is possible to attenuate disturbances, like measurement noise, that are present in the signal. The fitting procedure can be implemented on a controller, wherein most of the calculations are pre-performed or performed externally, and only a linear polynomial is evaluated locally in real time.

Figure 2:
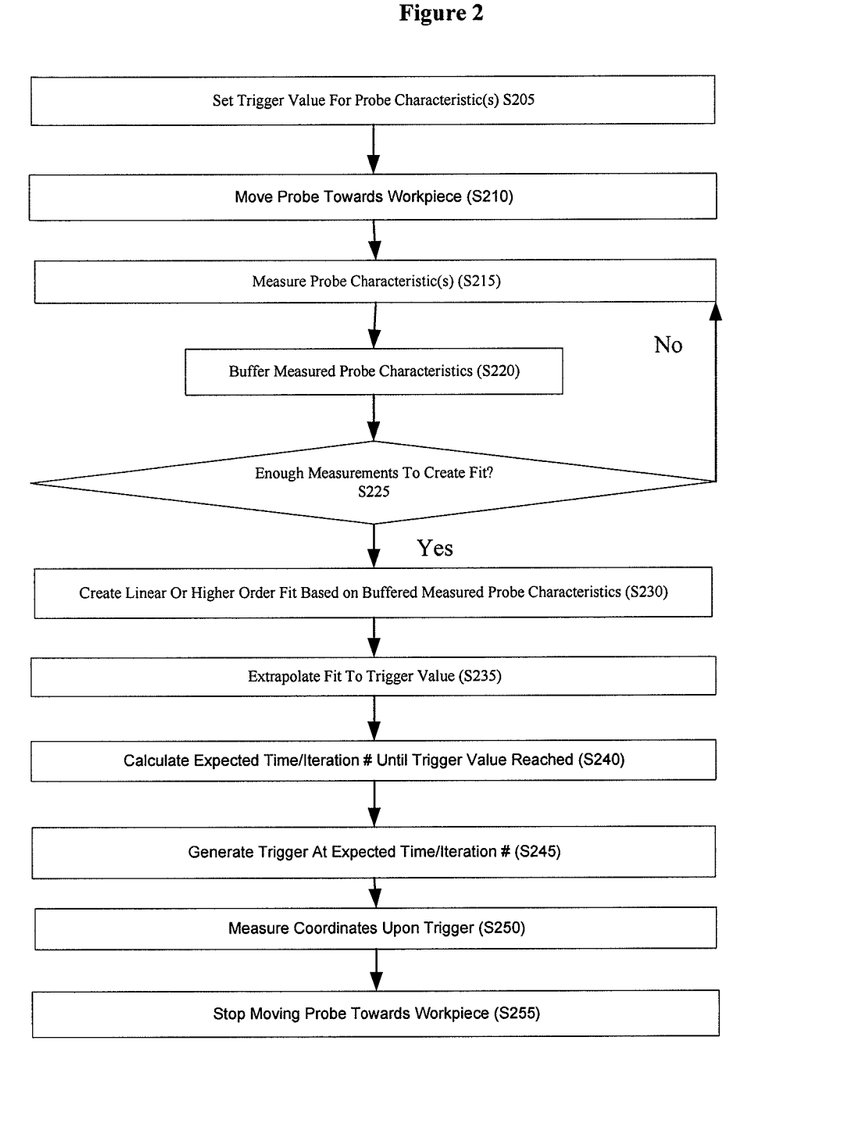
FIG. 2 shows a process for the high speed contact detector for measurement sensors, according to an aspect of the present disclosure.

FIG. 2 shows a process for the high speed contact detector for measurement sensors, according to an aspect of the present disclosure. As shown in FIG. 2, a trigger value is set for a probe characteristic at S205. The probe characteristic may be a deflection in one or more dimensions, or may be a different probe characteristic that can be consistently and accurately measured by a contact detector. At S210, the probe is moved towards the workpiece. At S215, the probe characteristic is measured, and at S220, data of the probe characteristic is buffered. A series of measured probe characteristics from the probe movement are generated in order to generate the equation that describes the fit. If there are not yet enough measurements of the probe characteristic to create a desired fit (S225=No), the process returns to S215 as the probe continues moving and the probe characteristics are again measured at S215 and data buffered at S220. Of course, the probe characteristics can be continually measured even when there are enough measurements to create a desired fit, so as to, for example, create an updated fit or verify the first equation generated to describe the fit.

If enough measurements of the probe characteristic have been created (S225=Yes), the linear or higher order fit is created based on the buffered data of the probe characteristics at S230. An extrapolation of the fit equation then projects to the trigger value at S235, and an expected time or iteration number until the trigger value is reached is calculated at S240. In other words, the fit process creates an equation that corresponds to a line or curve on a plot of the characteristic (deflection in this example) versus time. Using the equation generated to describe the fit, a time until the threshold characteristic will be reached is calculated/projected. The trigger is then generated for the expected time at S245. The coordinates that are the actual objective of the coordinate measuring machine are then measured at S250 at the expected/calculated/projected time. At S255, the relative movement of the probe towards the workpiece is stopped, and the process of FIG. 2 is restarted again to measure another coordinate point on the workpiece. The restarted process of FIG. 2 is a movement to approach the probe towards the workpiece from another angle and/or direction, so as to identify another coordinate of the workpiece shape. In another analogous embodiment, a process with steps such as those shown in FIG. 2 can be used for out-of-contact motion to identify when a threshold is met to confirm that a probe is out of contact with a workpiece.

In the process shown in FIG. 2, if only selected data points are collected at an interval (i.e., temporal spacing), the algorithm in the process can also calculate the expected number of points until the trigger should be given. In such interval collection of data of probe characteristics, a data point is not automatically collected at every iteration of time or, for example, spatial movement. In this case, the trigger can be generated at any iteration of time or spatial movement by the controller, even if no measurement of the characteristic would otherwise be taken due to the interval spacing requirements. In other words, the algorithm can calculate the expected amount of time or number of iterations (steps) until the trigger should be set, and then trigger the coordinate measurement even at a time that is not one of the corresponding times at which the characteristic measurement would be taken in the interval-spaced process. That is, the controller can be programmed to create a trigger before the next schedule time at which a data point could be scheduled in the interval timing. At the time of the trigger, the coordinates of the probe are taken as in S255 of FIG. 2. The controller waits the calculated number of time steps (iterations) and generates the trigger.

Additionally, the trigger algorithm used by the control system can be used on the way in when the probe is moved towards the workpiece, and on the way out when the probe is moved from the workpiece. The trigger algorithm used by the control system can also be used both on the way in and on the way out. As explained previously, a trigger may be set to take a coordinate measurement on the way out when the contact is almost zero, based on the extrapolated timing obtained from the fit for the probe characteristic in the withdrawing motion of the probe.

Accordingly, the high speed contact detector for measurement sensors accomplishes a highly accurate result for a touch-trigger signal which is used to measure probe coordinates. The touch-trigger signal is generated at a constant deflection, in a manner that is highly repeatable, and provides consistent results for the probe in different measurements of a workpiece. The number of false triggers is reduced by setting a time or corresponding iteration number based on previous measurements in the same movement, rather than on a level of the characteristic that is measured and determined in real-time to meet a threshold. The high speed contact detector for measurement sensors minimizes any delay between the actual (physical) probe trigger deflection and the generation of the touch-trigger signal by the controller, and can compensate for a consistent signal or processing delay. Further, false triggers can be avoided by not accepting, or ignoring, discarding, or otherwise not using false triggers that are physically generated due to noise effects such as vibrations before the time or corresponding iteration number set for the trigger.

Figure 6:
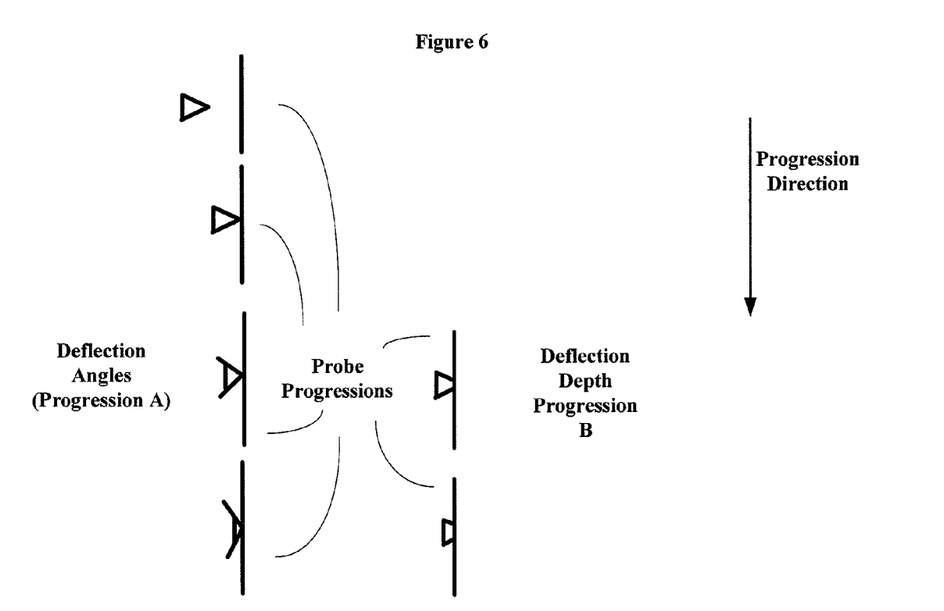
FIG. 6 shows measurable contact deflection characteristics of a probe used for the high speed contact detector for measurement sensors, according to an aspect of the present disclosure.

FIG. 6 shows a small series of progressive deflections of types that can measured as probe characteristics and used in the manner described herein. On the left side, a relative approach between a triangular probe and a vertical workpiece is shown where the angles of the triangular probe increase as the probe is pressed against the workpiece. On the right side of the progressions shown, the triangular probe is shown progressing into the vertical workpiece. These or other deflection characteristics that reflect the relative progressive contact between a probe and a workpiece can be used as the probe characteristics described herein.

The previous measurements of the characteristic can be taken from measurements in the same high speed process and probe movement for the same workpiece. The trigger set in the manner described herein may be therefore reflective of the particular parameters and characteristics of the workpiece being measured, the high speed contact detector being used for the measurements, the processing device, the order of the fit set by an operator, and other details particular to the immediate environment in which the trigger is being set.

Delay can also be minimized by the use of a fixed time window or windows, which allow(s) pre-computing of the time component of the fit, and helps avoid requiring real-time and local processing for this time component as the high speed contact detector is operating. This will greatly reduce the computational effort and load on the local controller in real time, which in turn results in a faster algorithm, which may be especially useful for parallel real-time computation processes, such as in an FPGA. Additionally, as described herein, the algorithm can be performed without calculating an inverse matrix explicitly, and with a reduced number of computations and a reduced sample delay.

The use of temporal spacing for measuring characteristics can help reduce computational requirements. Temporal spacing refers to the way in which data points are collected, and allows spaced sampling that does not take a sample at every time or iteration in the process at which a sample can otherwise be taken. An algorithm without temporal spacing will simply collect all available measurement points and use these points in further data processing. An algorithm with temporal spacing will take a data point at an interval, for example every 10th available measurement point is recorded. For an algorithm used for a high speed contact detector for measurement sensors, several data collection options are possible, including:

1.) using all points
2.) temporal spacing using points selected at a constant interval, which allows the possibility of using a filter, for example, to take the average value of points around the point of interest
3.) temporal spacing using points selected at varying intervals, which allows the possibility of taking an average value of points around a point of interest, and a possibility to always include the last measurement point using a shifting buffer A simplified version of an algorithm that uses all data points will be explained below. Afterwards, an algorithm that uses the temporal spacing in between the data points is explained, as the temporal spacing makes it possible to use a larger time window for noise filtering without increasing a buffer size for data of measured characteristics (and thus without increasing online real-time local calculations).

A. Fit with Fixed Temporal Spacing

In a fit with fixed temporal spacing, the algorithm fits a linear function to the measured deflection values ($d_{meas}$). Consequently, the function describing the probe deflection thus becomes $$d_{fit}(t) = \theta_0 + \theta_1 \cdot t = \begin{bmatrix} 1 & t \end{bmatrix} \begin{bmatrix} \theta_0 \\ \theta_1 \end{bmatrix}, \quad (2)$$

where $\Theta_0$=intercept term (value at which the fit crosses the y-axis)

and where $\Theta_1$=slope of the fit.

In order to simplify the further calculations, the fit parameter vector $\vec{\theta}$ is defined to be $$\vec{\theta} = \begin{bmatrix} \theta_0 \\ \theta_1 \end{bmatrix}. \quad (3)$$

Numerical values for the two fit parameters can be found analytically by performing an ordinary least squares regression, such that $$\vec{\theta} = (X^T X)^{-1} X^T \vec{y}, \quad (4)$$

where $$X = \begin{bmatrix} 1 & t_0 \\ 1 & t_1 \\ \vdots & \vdots \\ 1 & t_{n-2} \\ 1 & t_{n-1} \end{bmatrix} \quad (5)$$

and $$\vec{y} = \begin{bmatrix} d_{meas}(t_0) \\ d_{meas}(t_1) \\ \vdots \\ d_{meas}(t_{n-2}) \\ d_{meas}(t_{n-1}) \end{bmatrix}.$$

In the expressions (5) above, $t_i$ indicates the time instant i at which a measured value of the 3D probe deflection $d_{meas}(t_i)$ has been taken.

Conventionally, to find fit parameters it would be necessary to evaluate equations for every time the fit parameters are recalculated, and the calculations would include several matrix multiplications and taking the inverse of a matrix, which is computationally expensive in general. Because the fit in a high-speed process such as described herein is updated relatively frequently (e.g., for each movement of the probe to obtain a probe coordinate), there is a benefit to reducing online calculations so as not to overburden a local device used by a coordinate measuring machine. This can be done by taking measurement values in a moving time window with a value t=0 representing the current time instant. Furthermore, the numerical accuracy of the calculations can be increased by expressing the time values in samples instead of seconds (i.e., iterations versus a particular time). The process is not dependent on a fixed sample frequency.

A constant X-matrix can be obtained for a moving time window described above applied to equation (5):

$$X = \begin{bmatrix} 1 & t_0 \\ 1 & -1 \\ \vdots & \vdots \\ 1 & -(n-2) \\ 1 & -(n-1) \end{bmatrix}, \quad (6)$$

where n is the number of data points used to determine the fit parameters. Since X is now constant, the left part of equation 4 can be calculated beforehand, so that the vector of fit parameters is given by $$\vec{\theta} = M_{fit} \vec{y}, \quad (7)$$

where $$M_{fit} = (X^T X)^{-1} X^T \quad (8)$$

is a constant 2-by-n matrix that is only dependent on the number of data points n.

Due to the fact that X in the equations above is fixed and only depends on the number of data points used for the fit (n), the M-matrix can be determined beforehand and not in real-time or locally by the coordinate measuring machine. Essentially, the online calculations are reduced to the evaluation of two linear polynomials of the form $$\theta_0 = M_{fit}(1,1) \cdot y(t_0) + M_{fit}(1,2) \cdot y(t_{-1}) + \ldots + M_{fit}(1,n) \cdot y(t_{-(n-1)})$$

$$\theta_1 = M_{fit}(2,1) \cdot y(t_0) + M_{fit}(2,2) \cdot y(t_{-1}) + \ldots + M_{fit}(2,n) \cdot y(t_{-(n-1)}),$$

where $M_{fit}(1, j)$ and $M_{fit}(2, j)$ represent the elements of column j of the fit matrix $M_{fit}$. Thus, the process for calculating an equation that describes a fit for measurement characteristics is suited for evaluation by parallel hardware multipliers and adders of an FPGA.

For the derivation of the elements of $M_{fit}$, the matrix inverse from equation 8 is calculated first, as follows:

$$(X^T X)^{-1} = \left( \begin{bmatrix} 1 & 1 & \ldots & 1 & 1 \\ 0 & -1 & \ldots & -(n-2) & -(n-1) \end{bmatrix} \begin{bmatrix} 1 & 0 \\ 1 & -1 \\ \vdots & \vdots \\ 1 & -(n-2) \\ 1 & -(n-1) \end{bmatrix} \right)^{-1}$$

$$= \begin{bmatrix} n & -\sum_{i=1}^{n-1} i \\ -\sum_{i=1}^{n-1} i & \sum_{i=1}^{n-1} i^2 \end{bmatrix}^{-1}.$$

The inverse of a 2×2 matrix $$A = \begin{bmatrix} a_{11} & a_{12} \\ a_{21} & a_{22} \end{bmatrix}$$

is given by $$A^{-1} = \frac{1}{\det(A)} adj(A) \quad (9)$$

$$= \frac{1}{a_{11} a_{22} - a_{12} a_{21}} \begin{bmatrix} a_{11} & -a_{12} \\ -a_{21} & a_{22} \end{bmatrix}.$$

The determinant of the $X^T X$—matrix is thus given by $$\det(X^T X) = n \cdot \sum_{i=1}^{n-1} i^2 - \sum_{i=1}^{n-1} i \cdot \sum_{i=1}^{n-1} i, \quad (10)$$

while the adjugate matrix is given by $$adj(A) = \begin{bmatrix} \sum_{i=1}^{n-1} i^2 & \sum_{i=1}^{n-1} i \\ \sum_{i=1}^{n-1} i & n \end{bmatrix}. \quad (11)$$

Using these results, the expression for M can be simplified $$M_{fit} = \frac{1}{\det(X^T X)} \begin{bmatrix} \beta & \alpha \\ \alpha & n \end{bmatrix} \begin{bmatrix} 1 & 1 & \ldots & 1 & 1 \\ 0 & -1 & \ldots & -(n-2) & -(n-1) \end{bmatrix} \quad (12)$$

$$= \frac{1}{\det(X^T X)} \begin{bmatrix} \beta & \beta - \alpha & \ldots & \beta - (n-2)\alpha & \beta - (n-1)\alpha \\ \alpha & \alpha - n & \ldots & \alpha - (n-2)n & \alpha - (n-1)n \end{bmatrix},$$

where $$\alpha = \sum_{i=1}^{n-1} i$$

and $$\beta = \sum_{i=1}^{n-1} i^2.$$

Thus:

$$M_{fit}(1, j) = \frac{1}{\det(X^T X)} \left( \sum_{i=1}^{n-1} i^2 - (j-1) \sum_{i=1}^{n-1} i \right) \quad (13)$$

$$\Rightarrow M_{fit}(2, j) = \frac{1}{\det(X^T X)} \left( \sum_{i=1}^{n-1} i - (j-1)n \right).$$

Figure 3:
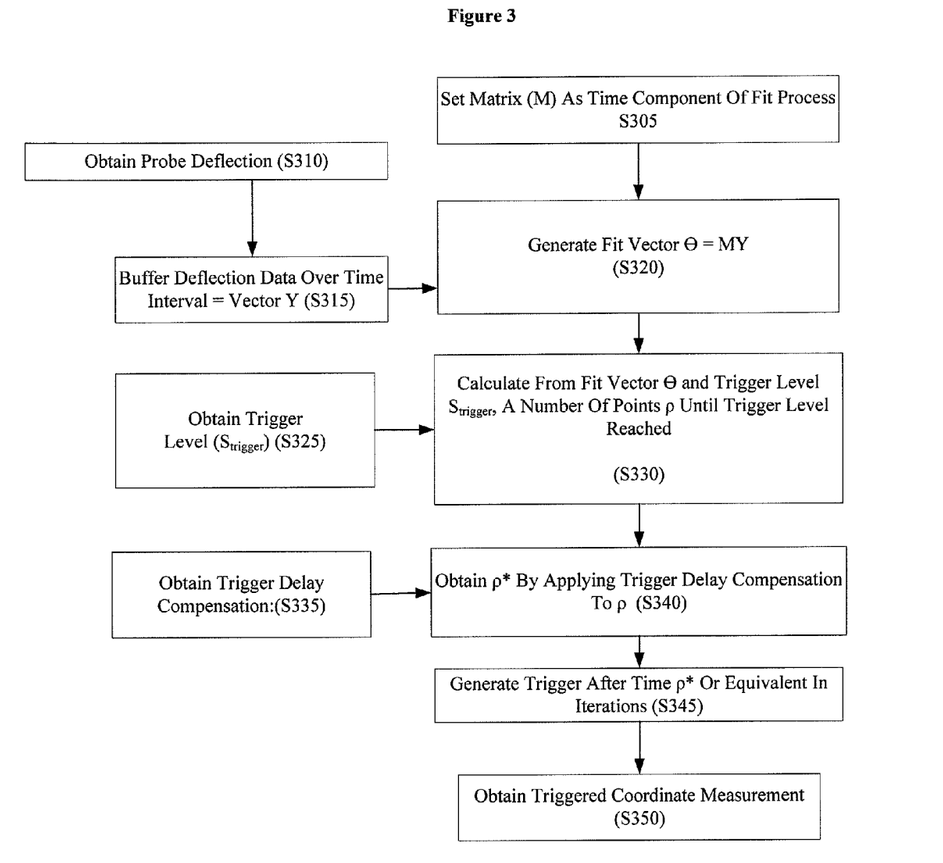
FIG. 3 shows another process for the high speed contact detector for measurement sensors, according to an aspect of the present disclosure.

Before proceeding to describing a fit in which individual data points are not added to a buffer, the overall process of generating a time until a threshold will be reached is described with respect to FIG. 3. In FIG. 3, the representations of column j in a fit matrix $M_{fit}$ with points spaced at a fixed value can be pre-calculated, and set as a time component of a fit process at S305. Additionally, a trigger level $S_{trigger}$ is precalculated at S325. At S310, a probe deflection characteristic is measured for one or more particular times or iterations, and the resultant data is buffered at S315. The fit vector Θ is generated from the buffered data and the Matrix (M) at S320. The fit vector Θ and trigger level $S_{trigger}$ are used at S330 to calculate a number of points ρ until the trigger level is reached. A trigger delay compensation is obtained at S335 and applied at S340, to compensate for consistent signal or processing delays in generating a trigger, and then the trigger is generated at S345 to $\rho^*$, which is the time for the calculated number of measurement points plus the trigger delay compensation. At S350, the measurement of coordinates is triggered. Although not shown, the process can be repeated each time a new probe deflection measurement is obtained at S310, so that a new trigger time is calculated.

As described, the deflection values obtained at S310 and buffered at S315 are used to obtain a trigger time when coordinates will be measured in the process described herein. The deflection values are broadly described as probe characteristics in this description, in the understanding that other similar characteristics that change in line with progressive contact between the probe and a workpiece can also be described as probe characteristics.

B. Fit with Parametric Temporal Spacing

In describing a fit with fixed temporal spacing above, it is assumed that at every actual sample instant a data point will be added to the measurement buffer. The length of the time window that can be used in practice is, therefore, limited by the capabilities of the target hardware. Limiting hardware factors include memory size and processing capabilities such as a number of multiplications that can be performed per sample etc. As explained previously, however, it is possible to increase the temporal length of the measurement window without increasing the memory demand by only adding every n-th data point to the buffer. This has an implication for the calculation of the fit parameters, which will now be explained.

First, the temporal spacing (s), expressed in samples, is now treated as a parameter of the algorithm. If s=1, the matrix X, and the vector $\vec{y}$ are the same as described above. However, for higher values of s, they become:

$$X = \begin{bmatrix} 1 & 0 \\ 1 & -s \\ 1 & -2s \\ \vdots & \vdots \\ 1 & -(n-2) \\ 1 & -(n-1) \end{bmatrix} \quad (14)$$

and $$\vec{y} = \begin{bmatrix} d_{meas}(0) \\ d_{meas}(-s) \\ d_{meas}(-2s) \\ \vdots \\ d_{meas}(-(n-2)s) \\ d_{meas}(-(n-1)s) \end{bmatrix}.$$

Next, the resulting $M_{fit}$ is derived analogously to the approach for fixed temporal spacing in the previous section.

$$(X^T X)^{-1} = \left( \begin{bmatrix} 1 & 1 & \ldots & 1 & 1 \\ 0 & -s & \ldots & -(n-2)s & -(n-1)s \end{bmatrix} \begin{bmatrix} 1 & 0 \\ 1 & -s \\ \vdots & \vdots \\ 1 & -(n-2) \\ 1 & -(n-1) \end{bmatrix} \right)^{-1} \quad (15)$$

$$= \begin{bmatrix} n & -\sum_{i=1}^{n-1} is \\ -\sum_{i=1}^{n-1} is & \sum_{i=1}^{n-1} i^2 s^2 \end{bmatrix}^{-1} = \begin{bmatrix} n & -\alpha s \\ -\alpha s & \beta s^2 \end{bmatrix}^{-1}$$

$$\Rightarrow (X^T X)^{-1} = \frac{1}{\det(X^T X)} \begin{bmatrix} \beta s^2 & \alpha s \\ \alpha s & n \end{bmatrix}$$

$$\det(X^T X) = n\beta s^2 - \alpha^2 s^2 = s^2(n\beta - \alpha^2) = s^2 \left( n \sum_{i=1}^{n-1} i^2 - \sum_{i=1}^{n-1} i \sum_{i=1}^{n-1} i \right) \quad (16)$$

$$M_{fit} = \frac{1}{\det(X^T X)} \begin{bmatrix} \beta s^2 & \alpha s \\ \alpha s & n \end{bmatrix} \begin{bmatrix} 1 & 1 & \ldots & 1 & 1 \\ 0 & -s & \ldots & -(n-2)s & -(n-1)s \end{bmatrix} \quad (17)$$

$$= \frac{1}{\det(X^T X)} \begin{bmatrix} \beta s^2 & \beta s^2 - \alpha s^2 & \ldots & \beta s^2 - (n-2)\alpha s^2 & \beta s^2 - (n-1)\alpha s^2 \\ \alpha s & \alpha s - ns & \ldots & \alpha s - (n-2)ns & \alpha s - (n-1)ns \end{bmatrix}$$

$$\Rightarrow \begin{array}{l} M_{fit}(1, j) = \frac{1}{\det(X^T X)} (\beta - (j-1)\alpha) s^2 \\ M_{fit}(2, j) = \frac{1}{\det(X^T X)} (\alpha - (j-1)n) s \end{array}$$

With these equations, the representations of column j in the fit Matrix $M_{fit}$ are derived, and can be used in the same linear polynomials described previously in order to obtain the linear parameters for slope and offset, except now for a time window which now does not include every data point when using parametric temporal spacing.

After the fit parameters have been determined, the fit can be extrapolated to predict whether the trigger threshold level will be crossed during the next sample. This helps ensure that an optimal coordinate measurement point is not missed when the next time or iteration for characteristic measurement is beyond the time for the optimal coordinate measurement point. The intercept term $\Theta_0$ represents the current filtered probe deflection, while the slope term $\Theta_1$ gives the change in deflection of the fit per sample. As a consequence, the prediction for the deflection value (dpred) at time instant $t_{n_p}$, i.e., $n_p$ after the current time instant, is obtained by $$d_{pred}(t_{n_p}) = \Theta_0 + n_p \cdot \Theta_1. \tag{18}$$

In an example where a control unit has an input-output delay of 10 samples, a prediction horizon of at least 10 samples is used. Therefore, the rule for the trigger generation becomes $$\text{trigger} = 1 \text{ if } \Theta_0 + 10 \cdot \Theta_1 \geq \text{triggerlevel}. \tag{19}$$

This indicates that a trigger is to be generated before the next sample time or iteration when the current deflection plus the expected change in deflection per sample, multiplied by the 10 sample delay, will be greater than the trigger level.

Another factor considered in the process described herein is the number of measurement points used in order to attenuate the noise to a reasonably accurate prediction. The number of windows can be calculated by investigating the effect of the least mean squares fit on the variance of the prediction. If the measurement signal is assumed to show the actual probe deflection which is contaminated by a normally distributed white noise characterized by $N(0, \sigma^2)$, the resulting variance of the LMS fit is given by $$\text{Var}(d_{pred}(t_i)) = \left(\frac{1}{n} + \frac{(t_i - \bar{t}^2)}{S_{xx}}\right)\sigma^2, \tag{20}$$

where $$S_{xx} = \sum_{j=1}^{n}(t_j - \bar{t})^2$$

$$\bar{t} = \frac{\sum_{k=1}^{n-1} ks}{n}.$$

Figure 5:
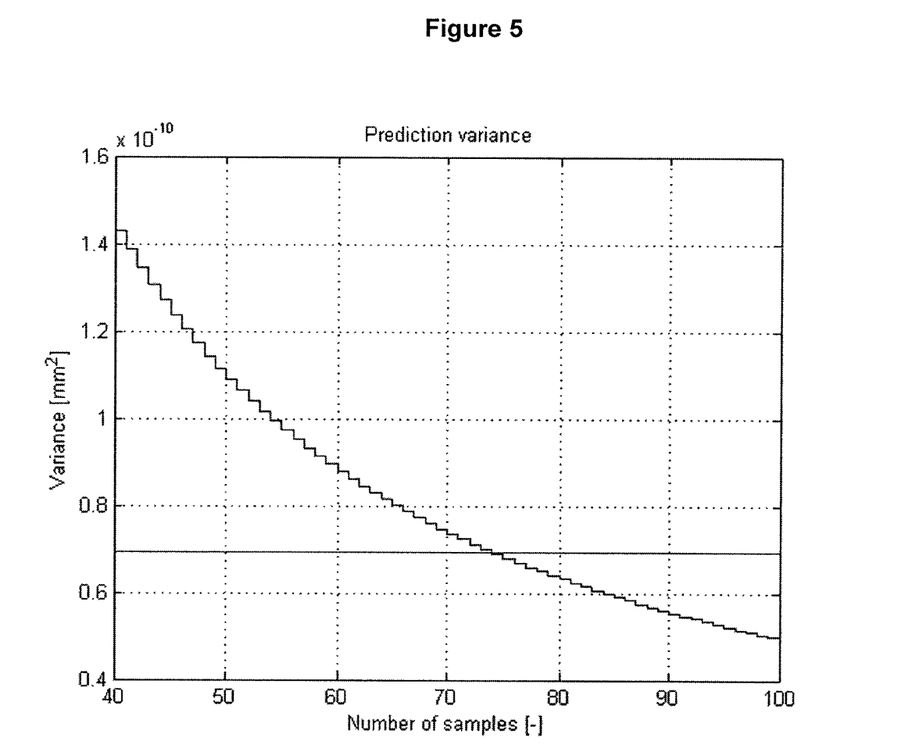
FIG. 5 shows a plot of Prediction Variance against a Number of Samples to identify a desired minimum number of probe characteristic measurement data points to use in fitting the probe characteristic measurement data points in order to set a trigger to measure coordinates, according to an aspect of the present disclosure.

From the equations above, it can be concluded that the resulting variance decreases when n is increased. The number of data points is thus chosen such that the resulting variance is lower than the desired one. In FIG. 5, the variance of an example fit, assuming a noise level of $\sigma^2 = 1.1111 \cdot 10^{-9}$ mm$^2$, is shown. The horizontal line indicates the targeted prediction variance of $6.9444 \cdot 10^{-11}$ mm$^2$. From FIG. 5, it can be seen that at least 74 measured characteristic points are needed to achieve the desired noise attenuation.

A control unit described herein may execute software instructions. A T-matrix may be used for one particular probe to calculate X, Y, Z tip displacement, based on probe signals A, B, C. A fit parameter vector is obtained from the measured deflection values of the probe, taking into account the offsets as described herein. The fit parameter vector is then used to generate a trigger time by the process described herein. At the calculated trigger time, coordinates of the probe are taken, and the probe is stopped. Using the example of FIG. 5 with 74 or more data points, software instructions executed by a control unit would cause a contact detector to measure contact between a probe and a workpiece 74 or more times. The contact characteristic measurements are then used to create a fit, which then projects a time ahead at which the contact characteristic measurements will meet a threshold. The time at which the threshold will be met is then set as the trigger time for taking the coordinate measurements, taking into account any expected processing or signaling delays.

Although the high speed contact detector for measurement sensors has been described with reference to several exemplary embodiments, it is understood that the words that have been used are words of description and illustration, rather than words of limitation. Changes may be made within the purview of the appended claims, as presently stated and as amended, without departing from the scope and spirit of the high speed contact detector for measurement sensors in its aspects. Although the high speed contact detector for measurement sensors has been described with reference to particular means, materials and embodiments, the high speed contact detector for measurement sensors is not intended to be limited to the particulars disclosed; rather the high speed contact detector for measurement sensors extends to all functionally equivalent structures, methods, and uses such as are within the scope of the appended claims.

In accordance with an aspect of the present disclosure, a method of measuring a workpiece using a contact detector includes moving the contact detector relatively towards a workpiece. A characteristic of the contact detector that changes as the contact detector contacts the workpiece is measured at a plurality of times. A projected time when the characteristic of the contact detector will meet a predetermined threshold is extrapolated from the characteristic measured the plurality of times using a processor of a computer. A trigger is set to measure coordinates of the workpiece at the projected time. A measurement of coordinates of the workpiece is triggered at the projected time based on the set trigger.

In accordance with another aspect of the present disclosure, the method further includes discarding a measurement of the characteristic that meets the predetermined threshold based on a time the measurement is taken.

In accordance with yet another aspect of the present disclosure, the time the measurement of the characteristic is taken is before the projected time, and the reason for discarding the measurement of the characteristic is that the measurement of the characteristic was taken before the projected time.

In accordance with still another aspect of the present disclosure, data of the measured characteristics at the plurality of times is buffered as the measurements of the characteristic are taken, and fit in accordance with a regression to a projectable equation from which the projected time is extrapolated.

In accordance with another aspect of the present disclosure, the method further includes determining an expected number of iterations of the measuring of the characteristic until the projected time based on the projectable equation.

In accordance with yet another aspect of the present disclosure, the method further includes pre-computing a matrix before measuring the workpiece using the contact detector, and using the matrix as a time component in the projectable equation when measuring the workpiece using the contact detector. In this regard, the matrix used by the contact detector may be pre-computed before the contact detection process, and using a device different than the controller described herein.

In accordance with still another aspect of the present disclosure, the method further includes using the data of the measured characteristic at the plurality of times as a magnitude component in the projectable equation.

In accordance with another aspect of the present disclosure, the characteristic comprises a deflection of the contact detector based on contact with the workpiece.

In accordance with yet another aspect of the present disclosure, the deflection is measured in a plurality of dimensions. The measured characteristics at the plurality of times are buffered as they are taken, and fit in accordance with a multi-dimensional regression to a projectable equation from which the projected time is extrapolated. An expected number of iterations of the measuring of the characteristic until the projected time is determined based on the projectable equation.

In accordance with still another aspect of the present disclosure, the deflection is incrementally increased at a substantially constant rate over time.

In accordance with another aspect of the present disclosure, the probe is moved at a substantially constant velocity during the plurality of times the measurements of the characteristic are taken.

In accordance with yet another aspect of the present disclosure, the method further includes offsetting a processing time during which processing delays are estimated to occur, so that the triggering of the measurement of the coordinates of the workpiece at the projected time is initiated in advance of the projected time by an amount of the processing time.

In accordance with still another aspect of the present disclosure, the method further includes using fewer than all available measurements of the characteristic in extrapolating the projected time.

In accordance with another aspect of the present disclosure, the method further includes discarding a trigger to take measurement of the coordinates of the workpiece without taking the measurement of the coordinates of the workpiece based on the trigger occurring prior to the projected time.

In accordance with yet another aspect of the present disclosure, the contact detector is moved relatively towards the workpiece at a predetermined constant velocity as the characteristic of the contact detector is measured the plurality of times.

In accordance with still another aspect of the present disclosure, the method further includes retracting the contact detector after the coordinates of the workpiece are measured at the projected time based on the set trigger.

In accordance with another aspect of the present disclosure, the method further includes identifying a coordinate location of the contact detector at the projected time based on the set trigger.

In accordance with yet another aspect of the present disclosure, the projected time is extrapolated using a fit that is dynamically varied for different measurements of the contact detector as the contact detector is relatively moved towards the same workpiece, and in accordance with a regression to a projectable equation from which the projected time is extrapolated.

In accordance with an aspect of the present disclosure, a computer apparatus measures a workpiece using a contact detector. A memory stores instructions. A processor executes the instructions. When executed by the processor, the instructions cause the processor to perform operations including moving the contact detector relatively towards a workpiece. A characteristic of the contact detector that changes as the contact detector contacts the workpiece is measured at a plurality of times. A projected time when the characteristic of the contact detector will meet a predetermined threshold is extrapolated from the characteristic measured the plurality of times and using a processor of a computer. A trigger is set to measure coordinates of the workpiece at the projected time. A measurement of the coordinates of the workpiece is triggered at the projected time based on the set trigger In accordance with an aspect of the present disclosure, a tangible computer readable storage medium stores a computer program for measuring a workpiece using a contact detector. The computer program, when executed by a processor, causes a computer apparatus to perform a process including moving the contact detector relatively towards a workpiece. A characteristic of the contact detector that changes as the contact detector contacts the workpiece is measured at a plurality of times. A projected time when the characteristic of the contact detector will meet a predetermined threshold is extrapolated from the characteristic measured the plurality of times and using a processor of a compute. A trigger is set to measure coordinates of the workpiece at the projected time. A measurement of the coordinates of the workpiece is triggered at the projected time based on the set trigger While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of measuring a workpiece using a contact detector, comprising:
moving the contact detector relatively towards a workpiece;
measuring at a plurality of times a characteristic of the contact detector that changes as the contact detector contacts the workpiece;
extrapolating, from the characteristic measured the plurality of times and using a processor of a computer, a projected time when the characteristic of the contact detector will meet a predetermined threshold;
setting a trigger to measure coordinates of the workpiece at the projected time, and
triggering a measurement of coordinates of the workpiece at the projected time based on the set trigger.

2. The method of claim 1, further comprising:
discarding a measurement of the characteristic that meets the predetermined threshold based on a time the measurement is taken.

3. The method of claim 2,
wherein the time the measurement of the characteristic is taken is before the projected time, and the reason for discarding the measurement of the characteristic is that the measurement of the characteristic was taken before the projected time.

4. The method of claim 1,
wherein data of the measured characteristics at the plurality of times is buffered as the measurements of the characteristic are taken, and fit in accordance with a regression to a projectable equation from which the projected time is extrapolated.

5. The method of claim 4, further comprising:
determining an expected number of iterations of the measuring of the characteristic until the projected time based on the projectable equation.

6. The method of claim 4, further comprising:
pre-computing a matrix before measuring the workpiece using the contact detector; and
using the matrix as a time component in the projectable equation when measuring the workpiece using the contact detector.

7. The method of claim 6, further comprising:
using the data of the measured characteristic at the plurality of times as a magnitude component in the projectable equation.

8. The method of claim 1,
wherein the characteristic comprises a deflection of the contact detector based on contact with the workpiece.

9. The method of claim 8,
wherein the deflection is measured in a plurality of dimensions,
wherein the measured characteristics at the plurality of times are buffered as they are taken, and fit in accordance with a multi-dimensional regression to a projectable equation from which the projected time is extrapolated, and
wherein an expected number of iterations of the measuring of the characteristic until the projected time is determined based on the projectable equation.

10. The method of claim 8,
wherein the deflection is incrementally increased at a substantially constant rate over time.

11. The method of claim 10,
wherein the probe is moved at a substantially constant velocity during the plurality of times the measurements of the characteristic are taken.

12. The method of claim 1, further comprising:
offsetting a processing time during which processing delays are estimated to occur, so that the triggering of the measurement of the coordinates of the workpiece at the projected time is initiated in advance of the projected time by an amount of the processing time.

13. The method of claim 1, further comprising:
using fewer than all available measurements of the characteristic in extrapolating the projected time.

14. The method of claim 1, further comprising:
discarding a trigger to take measurement of the coordinates of the workpiece without taking the measurement of the coordinates of the workpiece based on the trigger occurring prior to the projected time.

15. The method of claim 1,
wherein the contact detector is moved relatively towards the workpiece at a predetermined constant velocity as the characteristic of the contact detector is measured the plurality of times.

16. The method of claim 1, further comprising:
retracting the contact detector after the coordinates of the workpiece are measured at the projected time based on the set trigger.

17. The method of claim 1, further comprising:
identifying a coordinate location of the contact detector at the projected time based on the set trigger.

18. The method of claim 1,
wherein the projected time is extrapolated using a fit that is dynamically varied for different measurements of the contact detector as the contact detector is relatively moved towards the same workpiece, and in accordance with a regression to a projectable equation from which the projected time is extrapolated.

19. A computer apparatus for measuring a workpiece using a contact detector, comprising:
a memory that stores instructions, and a processor that executes the instructions,
wherein, when executed by the processor, the instructions cause the processor to perform operations comprising:
moving the contact detector relatively towards a workpiece;
measuring at a plurality of times a characteristic of the contact detector that changes as the contact detector contacts the workpiece;
extrapolating, from the characteristic measured the plurality of times and using a processor of a computer, a projected time when the characteristic of the contact detector will meet a predetermined threshold;
setting a trigger to measure coordinates of the workpiece at the projected time, and
triggering a measurement of the coordinates of the workpiece at the projected time based on the set trigger.

20. A tangible computer readable storage medium that stores a computer program for measuring a workpiece using a contact detector, the computer program, when executed by a processor, causing a computer apparatus to perform a process comprising:
moving the contact detector relatively towards a workpiece;
measuring at a plurality of times a characteristic of the contact detector that changes as the contact detector contacts the workpiece;
extrapolating, from the characteristic measured the plurality of times and using a processor of a computer, a projected time when the characteristic of the contact detector will meet a predetermined threshold;
setting a trigger to measure coordinates of the workpiece at the projected time, and
triggering a measurement of the coordinates of the workpiece at the projected time based on the set trigger,
wherein a matrix is computed before measuring the workpiece using the contact detector, and
wherein data of the measured characteristics at the plurality of times is buffered as the measurements of the characteristic are taken, and fit in accordance with a regression to a projectable equation from which the projected time is extrapolated, and
wherein the matrix is used as a time component in the projectable equation when measuring the workpiece using the contact detector.

* * * * *